Patented Dec. 10, 1940

2,224,317

UNITED STATES PATENT OFFICE 2,224,317

AZO DYESTUFFS INSOLUBLE IN WATER AND FIBER DYED THEREWITH

Kurt Schimmelschmidt and Oskar Schneider, Frankfort-on-the-Main, Germany, assignors to General Aniline & Film Corporation, a corporation of Delaware No Drawing. Application July 1, 1939, Serial No. 282,524. In Germany July 5, 1938

10 Claims. (Cl. 260—152)

The present invention relates to azo-dyestuffs insoluble in water and to fiber dyed therewith; more particularly it relates to the dyestuffs of the following general formula:

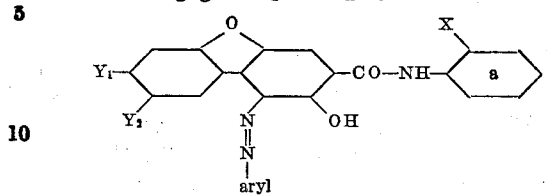

wherein $Y_1$ stands for hydrogen, a methyl or methoxy group, $Y_2$ stands for hydrogen or a methyl group, always one of the two substituents $Y_1$ and $Y_2$ being hydrogen, X means an alkyl or alkoxy group or a chlorine atom and wherein the phenyl radical $a$ may contain further substituents, advantageously an alkoxy group or a halogen atom.

We have found that valuable azo-dyestuffs insoluble in water may be obtained by coupling in substance, on the fiber or on a substratum adapted for the production of lakes any diazo compound with a 3-hydroxydiphenylene-oxide-2-carboxylic acid anilide of the general formula:

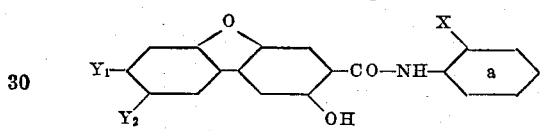

wherein
$Y_1$ stands for hydrogen, a methyl or methoxy group,
$Y_2$ stands for hydrogen or a methyl group, always one of the two substituents $Y_1$ and $Y_2$ being hydrogen,
X means an alkyl or alkoxy group or a chlorine atom and wherein the phenyl radical $a$ may contain further substituents, advantageously an alkoxy group or a halogen atom, only such dyestuff components being used as do not contain any group imparting solubility in water, such as the sulphonic acid or carboxylic acid group.

When produced on the fiber the azo-dyestuffs obtainable by the present invention yield brown, khaki and olive dyeings of very good properties of fastness, particularly of very good fastness to light. In comparison with comparable azo-dyestuffs described in German Specification No. 594,326 the new dyestuffs surprisingly show a considerable displacement of the colour shade. Furthermore, the dyeings obtainable by the invention only slightly change their shade when boiled with soap and are distinguished by an improved fastness to rubbing. These effects obtained by the introduction of a methyl or methoxy group into 7-position or of a methyl group into 6-position of the 3-hydroxydiphenylene-oxide-2-carboxylic acid arylides could in no way be foreseen.

By the new process especially khaki shades can be produced of a fastness hitherto unattained with ice colours; it, therefore, represents a valuable advance in the art.

The 7-methyl-3-hydroxydiphenylene-oxide-2-carboxylic acid anilides used as parent material may be obtained by transforming according to known methods the 7-methyl-3-hydroxydiphenylene-oxide obtainable as described in U. S. application Serial No. 120,826, filed January 15, 1937, into the 7-methyl-3-hydroxydiphenylene-oxide-2-carboxylic acid melting at 293° C.–294° C. and condensing the latter in known manner with the corresponding amines of the benzene series. In a similar manner there may be prepared the 7-methoxy- or 6-methyl-3-hydroxydiphenylene-oxide-2-carboxylic acid anilides from the 7-methoxy- or 6-methyl-3-hydroxydiphenylene-oxide described in the before-mentioned U. S. application Serial No. 120,826, by way of the 7-methoxy-3-hydroxydiphenylene-oxide-2-carboxylic acid melting at 286° C. or the 6-methyl-3-hydroxydiphenylene-oxide-2-carboxylic acid melting at 282° C.–283° C.

The following examples serve to illustrate the invention, but they are not intended to limit it thereto, the parts being by weight; the parts by weight and the parts by volume are related to each other as are kilograms to liters:

(1) 1 part of 1-(7'-methyl-3'-hydroxydiphenylene-oxide-2'-carbonylamino)-2-methyl-4-methoxybenzene, melting at 254° C.–255° C. is dissolved in 4 parts by volume of alcohol, 0.47 part by volume of caustic soda solution of 34° Bé. and 6 parts by volume of water, and the whole is made up to 1000 parts by volume by means of water to which 18.3 parts by volume of caustic soda solution of 34° Bé. and the usual protective colloids have been added. 50 parts of cotton yarn are treated for ½ hour in this grounding solution, squeezed and developed for ½ hour in a diazo-solution prepared in the usual manner from 2 parts of 1-amino-2-methyl-4-chlorobenzene and made up to 1000 parts by volume. The yarn is then rinsed, soaped and dried. A khaki shade of very good fastness to wet-processing, to rubbing and to light is obtained.

(2) 36 parts of 1-(7'-methyl-3'-hydroxydiphenylene-oxide-2'-carbonylamino)-2-methyl-4-methoxybenzene are dissolved in water with addition of caustic soda solution. After addition of sodium acetate a diazo-solution prepared from 14.1 parts of 1-amino-2-methyl-4-chlorobenzene is added. The yellow-brown dyestuff obtained is filtered with suction, washed and dried. When produced in the usual manner on a substratum, suitably in the form of a paste, it yields a yellow-brown lake of good properties. The dyestuff corresponds with the following formula:

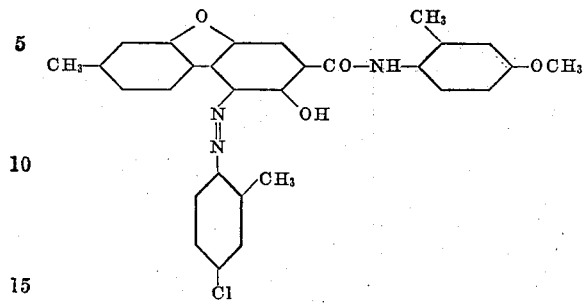

(3) 1 part of 1-(7'-methyl-3'-hydroxydiphenylene - oxide - 2' - carbonylamino) - 2-chloro - 4-methoxybenzene, melting at 262° C.–263° C. is dissolved in 4 parts by volume of alcohol, 0.4 part by volume of caustic potash solution of 50° Bé. and 6 parts by volume of water, and the whole is made up to 1000 parts by volume by means of water to which 18 parts by volume of caustic soda solution of 34° Bé. and the usual protective colloids have been added. 50 parts of cotton yarn are treated for ½ hour in this grounding solution, squeezed and developed for ½ hour in a diazo-solution prepared in the usual manner from 2 parts of 1-amino-2-methyl-3-chlorobenzene and made up to 1000 parts by volume. The yarn is then rinsed, soaped and dried. A greenish khaki shade of very good fastness to wet-processing, to rubbing and to light is obtained.

The following table indicates a number of other azo-dyestuffs obtainable by the invention and having similar properties:

| | Diazo-component | Coupling-component | Shade |
|---|---|---|---|
| 1 | 1-amino-2-methoxy-5-nitrobenzene | 1-(7'-methyl-3'-hydroxy-diphenyleneoxide-2'-carbonylamino)-2-methyl-4-methoxybenzene. | Olive dark brown. |
| 2 | 1-amino-2-methoxy-5-chlorobenzene | ___do___ | Dark brown. |
| 3 | 1-amino-2-methyl-3-chlorobenzene | ___do___ | Greenish brown. |
| 4 | 1-amino-2-methyl-5-chlorobenzene | ___do___ | Do. |
| 5 | 2-amino-4.4'-di-chloro-diphenylether | ___do___ | Brown. |
| 6 | 1-amino-3-chloro-benzene | ___do___ | Olive brown. |
| 7 | 1-amino-2-chloro-5-trifluoromethyl-benzene | ___do___ | Khaki. |
| 8 | 1-amino-2-methyl-4-chlorobenzene | 1-(7'-methyl-3'-hydroxy-diphenyleneoxide-2'-carbonylamino)-2.5-dimethoxybenzene, melting point 230–231° C. | Yellowish brown. |
| 9 | 1-amino-2-methoxy-5-chlorobenzene | ___do___ | Greenish brown. |
| 10 | 1-amino-2-nitrobenzene | ___do___ | Olive. |
| 11 | 1-amino-4-nitrobenzene | ___do___ | Do. |
| 12 | 1-amino-2.5-dichlorobenzene | 1-(7'-methyl-3'-hydroxy-diphenyleneoxide-2'-carbonylamino)-2-methoxy-benzene, melting point 247–249° C. | Khaki. |
| 13 | 1-amino-2-methyl-5-nitrobenzene | ___do___ | Do. |
| 14 | 1-amino-2-chlorobenzene | 1-(7'-methyl-3'-hydroxy-diphenyleneoxide-2'-carbonylamino)-2-methylbenzene, melting point 268–269° C. | Olive brown. |
| 15 | 1-amino-2.4-dimethyl-5-benzoylaminobenzene | ___do___ | Khaki. |
| 16 | 1-amino-2-methyl-3-chlorobenzene | ___do___ | Greenish khaki. |
| 17 | 1-amino-3-chlorobenzene | 1-(7'-methyl-3'-hydroxydiphenyleneoxide-2'-carbonylamino)-2-chloro-4-methoxybenzene. | Do. |
| 18 | 1-amino-3.5-bistrifluoromethylbenzene | ___do___ | Olive brown. |
| 19 | 1-amino-2-methyl-4-chlorobenzene | ___do___ | Khaki. |
| 20 | 1-amino-2-methoxy-5-chlorobenzene | 1-(7'-methyl-3'-hydroxydiphenyleneoxide-2'-carbonylamino)-2-chloro-5-methoxybenzene, melting point 233–235° C. | Dark brown. |
| 21 | 1-amino-2-methyl-3-chlorobenzene | ___do___ | Khaki. |
| 22 | 1-amino-2-methoxy-5-chlorobenzene | 1-(6'-methyl-3'-hydroxydiphenyleneoxide-2'-carbonylamino)-2.5-dimethoxybenzene, melting point 160–161° C. | Dark brown. |
| 23 | 1-amino-2.5-dichlorobenzene | ___do___ | Covered brown. |
| 24 | 1-amino-2-chloro-4-benzoylamino-5-methoxybenzene | ___do___ | Copper brown. |
| 25 | 1-amino-2-methyl-3-chlorobenzene | ___do___ | Brown. |
| 26 | 1-amino-2-methyl-4-chlorobenzene | ___do___ | Covered brown. |
| 27 | 1-amino-2-methyl-4-chlorobenzene | 1-(6'-methyl-3'-hydroxydiphenyleneoxide-2'-carbonylamino)-2-methyl-4-methoxybenzene, melting point 226–228° C. | Brown. |
| 28 | 1-amino-2-methoxy-5-chlorobenzene | ___do___ | Dark brown. |
| 29 | 1-amino-2.5-dichlorobenzene | ___do___ | Greenish brown. |
| 30 | 1-amino-2-chlorobenzene | ___do___ | Olive brown. |
| 31 | 1-amino-2-chloro-4-benzoylamino-5-methoxybenzene. | ___do___ | Brown. |
| 32 | 1-amino-2-methyl-5-chlorobenzene | ___do___ | Do. |
| 33 | 1-amino-2-methyl-3-chlorobenzene | ___do___ | Do. |
| 34 | 1-amino-2.5-dichlorobenzene | 1-(6'-methyl-3'-hydroxy-diphenyleneoxide-2'-carbonylamino)-2-methoxybenzene, melting point 198–199° C. | Covered brown. |
| 35 | 1-amino-2-methyl-4-chlorobenzene | ___do___ | Do. |
| 36 | 1-amino-2-methoxy-5-chlorobenzene | ___do___ | Dark brown. |
| 37 | 1-amino-2-chloro-4-benzoylamino-5-methoxybenzene. | ___do___ | Copper brown. |
| 38 | 1-amino-2.5-dichlorobenzene | 1-(6'-methyl-3'-hydroxy-diphenyleneoxide-2'-carbonylamino)-2.5-dimethoxy-4-chlorobenzene, melting point 234–236° C. | Brown. |
| 39 | 1-amino-2-methoxy-5-chlorobenzene | ___do___ | Dark brown. |
| 40 | 1-amino-2-methyl-3-chlorobenzene | ___do___ | Brown. |
| 41 | 1-amino-2-methyl-4-chlorobenzene | 1-(6'-methyl-3'-hydroxy-diphenyleneoxide-2'-carbonylamino)-2-chloro-4-methoxy-benzene, melting point 225–227° C. | Yellowish brown. |
| 42 | 1-amino-2-methoxy-5-chlorobenzene | ___do___ | Red-brown. |
| 43 | 1-amino-2.5-dichlorobenzene | ___do___ | Yellowish brown. |
| 44 | 1-amino-2-methyl-4-chlorobenzene | 1-(6'-methyl-3'-hydroxy-diphenyleneoxide-2'-carbonylamino)-2-chloro-5-methoxy-benzene, melting point 215–217° C. | Do. |
| 45 | 1-amino-2-methoxy-5-chlorobenzene | ___do___ | Red-brown. |
| 46 | 1-amino-3-chlorobenzene | ___do___ | Yellowish khaki. |
| 47 | 1-amino-2-methyl-4-chlorobenzene | 1-(6'-methyl-3'-hydroxy-diphenyleneoxide-2'carbonylamino)-2-methoxy-4-chlorobenzene, melting point 234–235° C. | Khaki. |
| 48 | 1-amino-2.5-dichlorobenzene | ___do___ | Do. |
| 49 | 1-amino-2-chlorobenzene | ___do___ | Yellowish khaki. |
| 50 | 1-amino-2-methyl-5-chlorobenzene | ___do___ | Khaki. |
| 51 | 1-amino-2-methyl-3-chlorobenzene | ___do___ | Do. |
| 52 | 1-amino-2-chloro-5-trifluoromethylbenzene | ___do___ | Do. |
| 53 | 1-amino-2-methyl-5-nitrobenzene | ___do___ | Do. |
| 54 | 1-amino-2-methyl-5-chlorobenzene | 1-(7'-methoxy-3'-hydroxy-diphenyleneoxide-2'-carbonylamino)-2.5-dimethoxybenzene, melting point 234–236° C. | Brown. |
| 55 | 1-amino-2-methoxy-5-chlorobenzene | ___do___ | Dark brown. |
| 56 | 1-amino-2-methyl-3-chlorobenzene | ___do___ | Brown. |
| 57 | 1-amino-2-methyl-5-nitrobenzene | ___do___ | Do. |
| 58 | 1-amino-2-methyl-5-chlorobenzene | 1-(7'-methoxy-3'-hydroxy-diphenyleneoxide-2'-carbonylamino)-2-methyl-4-methoxy-benzene, melting point 250–251° C. | Do. |
| 59 | 1-amino-2-methoxy-5-chlorobenzene | ___do___ | Dark brown. |
| 60 | 1-amino-2.5-dichlorobenzene | ___do___ | Brown. |
| 61 | 1-amino-4-nitrobenzene | ___do___ | Do. |

| | | Diazo-component | Coupling-component | Shade | |
|---|---|---|---|---|---|
| | 62 | 1-amino-2-methyl-3-chlorobenzene | 1-(7'-methoxy-3'-hydroxy-diphenyleneoxide-2'-carbonylamino)-2-methyl-4-methoxy-benzene, melting point 250–251° C. | Brown. | |
| | 63 | 1-amino-2-chloro-4-benzoylamino-5-methoxybenzene. | ......do...... | Copper brown. | |
| | 64 | 1-amino-2-methyl-5-nitrobenzene | ......do...... | Brown. | |
| | 65 | 1-amino-2-methyl-4-chlorobenzene | ......do...... | Do. | |
| | 66 | 1-amino-2-methoxy-5-nitrobenzene | ......do...... | Do. | |
| | 67 | 1-amino-2-methyl-4-chlorobenzene | 1-(7'-methoxy-3'-hydroxydiphenyleneoxide-2'-carbonylamino)-2.5-dimethoxy-4-chlorobenzene, melting point 273–274° C. | Do. | |
| | 68 | 1-amino-2-methoxy-5-chlorobenzene | ......do...... | Dark brown. | |
| | 69 | 1-amino-2.5-dichlorobenzene | ......do...... | Brown. | |
| | 70 | 1-amino-2-methyl-3-chlorobenzene | ......do...... | Do. | |
| | 71 | 1-amino-2.5-dichlorobenzene | 1-(7'-methoxy-3'-hydroxy-diphenyleneoxide-2'-carbonylamino)-2-methylbenzene, melting point 267° C. | Do. | |
| | 72 | 1-amino-2-methoxy-5-chlorobenzene | ......do...... | Red brown. | |
| | 73 | 1-amino-2.5-dichlorobenzene | 1-(7'-methoxy-3'-hydroxydiphenyleneoxide-2'-carbonylamino)-2-methoxybenzene, melting point 232–233° C. | Brown. | |
| | 74 | 1-amino-2-methyl-3-chlorobenzene | ......do...... | Do. | |
| | 75 | 1-amino-2-methyl-4-chlorobenzene | ......do...... | Do. | |
| | 76 | 1-amino-2-methoxy-5-chlorobenzene | ......do...... | Dark brown. | |
| | 77 | 1-amino-2-chloro-4-benzoylamino-5-methoxybenzene | ......do...... | Copper brown. | |
| | 78 | 1-amino-2-methyl-4-chlorobenzene | 1-(7'-methoxy-3'-hydroxydiphenyleneoxide-2'-carbonylamino)-2-methoxy-4-chlorobenzene, melting point 273° C. | Brown. | |
| | 79 | 1-amino-2-methoxy-5-chlorobenzene | ......do...... | Dark brown. | |
| | 80 | 1-amino-2.5-dichlorobenzene | ......do...... | Brown. | |
| | 81 | 1-amino-2-methyl-3-chlorobenzene | ......do...... | Do. | |
| | 82 | 1-amino-2-methyl-4-chlorobenzene | 1-(7'-methoxy-3'-hydroxydiphenyleneoxide-2'-carbonylamino)-2-chloro-4-methoxybenzene, melting point 252–253° C. | Do. | |
| | 83 | 1-amino-2-methoxy-5-chlorobenzene | ......do...... | Violetish brown. | |
| | 84 | 1-amino-2-methyl-3-chlorobenzene | ......do...... | Brown. | |

Since an object of the present invention is to provide dyestuffs of good fastness properties which dyestuffs are insoluble in water and alkalies, it is to be understood that the aromatic nuclei of the general formulae appearing in the appended claims do not contain any substituents which are known to render organic compounds soluble in water or alkalies and to tend to depreciate the fastness of the dyestuffs to alkalies. Substituents of this kind are, for instance, the sulfonic and the carboxylic acid group.

We claim:

1. The water-insoluble azo-dyestuffs corresponding with the following general formula:

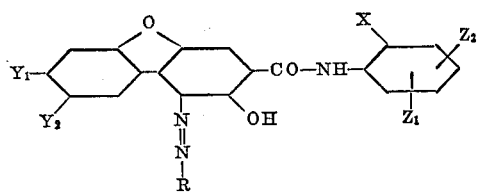

wherein $Y_1$ stands for one of the group consisting of hydrogen, methyl and methoxy, $Y_2$ for one of the group consisting of hydrogen and methyl, always one of the two substituents $Y_1$ and $Y_2$ being hydrogen, X stands for a member of the group consisting of methyl, methoxy and chlorine, $Z_1$ for a member of the group consisting of hydrogen and methoxy, $Z_2$ for a member of the group consisting of hydrogen and chlorine, and R stands for a radical of the benzene series, yielding, when produced on the fiber, brown, khaki and olive dyeings of very good properties of fastness, particularly of very good fastness to light.

2. The water-insoluble azo-dyestuffs corresponding with the following general formula:

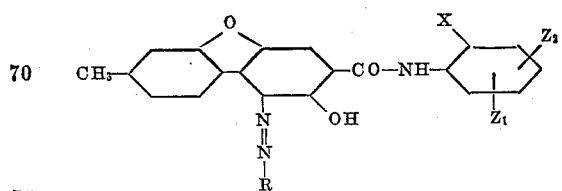

wherein X stands for a member of the group consisting of methyl, methoxy and chlorine, $Z_1$ for a member of the group consisting of hydrogen and methoxy, $Z_2$ for a member of the group consisting of hydrogen and chlorine, and R stands for a radical of the benzene series, yielding, when produced on the fiber, brown, khaki and olive dyeings of very good properties of fastness, particularly of very good fastness to light.

3. The water-insoluble azo-dyestuff of the following formula:

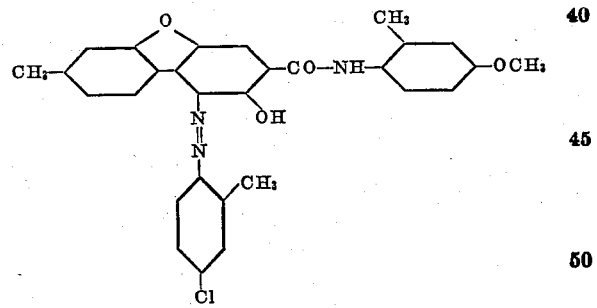

yielding, when produced on the fiber, khaki dyeings of very good fastness to wet-processing, to rubbing and to light.

4. The water-insoluble azo-dyestuffs of the following formula:

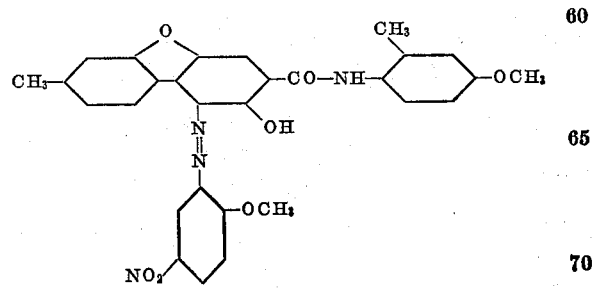

yielding, when produced on the fiber, olive dark-brown dyeings of very good fastness to wet-processing, to rubbing and to light.

5. The water-insoluble azo-dyestuff of the following formula:

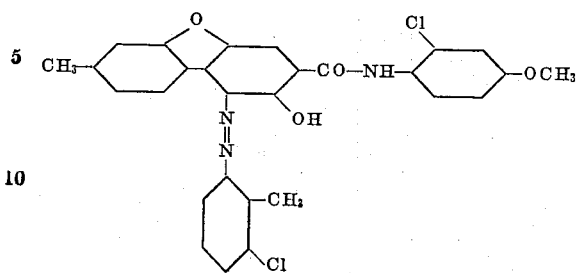

yielding, when produced on the fiber, greenish-khaki dyeings of very good fastness to wet-processing, to rubbing and to light.

6. Fiber dyed with the dyestuffs as claimed in claim 1.

7. Fiber dyed with the dyestuffs as claimed in claim 2.

8. Fiber dyed with the dyestuff as claimed in claim 3.

9. Fiber dyed with the dyestuff as claimed in claim 4.

10. Fiber dyed with the dyestuff as claimed in claim 5.

KURT SCHIMMELSCHMIDT.
OSKAR SCHNEIDER.